US011396598B2

(12) United States Patent
Oh et al.

(10) Patent No.: US 11,396,598 B2
(45) Date of Patent: Jul. 26, 2022

(54) PBS COMPOSITE MATERIAL AND METHOD FOR PRODUCING SAME

(71) Applicant: KOREA RESEARCH INSTITUTE OF CHEMICAL TECHNOLOGY, Daejeon (KR)

(72) Inventors: Dong Yeop Oh, Busan (KR); Jong Geon Jegal, Ulsan (KR); Sung Yeon Hwang, Seoul (KR); Je Young Park, Ulsan (KR); Tae Ho Kim, Busan (KR); Hyeon Yeol Jeon, Busan (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 85 days.

(21) Appl. No.: 16/625,260

(22) PCT Filed: Jun. 20, 2018

(86) PCT No.: PCT/KR2018/006977
§ 371 (c)(1),
(2) Date: Dec. 20, 2019

(87) PCT Pub. No.: WO2018/236151
PCT Pub. Date: Dec. 27, 2018

(65) Prior Publication Data
US 2020/0216660 A1  Jul. 9, 2020

(30) Foreign Application Priority Data
Jun. 20, 2017 (KR) .................. 10-2017-0078058

(51) Int. Cl.
*C08L 67/02* (2006.01)
*C08L 1/02* (2006.01)
*B82Y 30/00* (2011.01)

(52) U.S. Cl.
CPC .............. *C08L 67/02* (2013.01); *C08L 1/02* (2013.01); *B82Y 30/00* (2013.01)

(58) Field of Classification Search
CPC combination set(s) only.
See application file for complete search history.

(56) References Cited

U.S. PATENT DOCUMENTS

| 6,204,306 | B1 | 3/2001 | Chabrecek et al. | |
|---|---|---|---|---|
| 2009/0192329 | A1 | 7/2009 | Awang et al. | |
| 2013/0090401 | A1* | 4/2013 | Hashaikeh | C08L 1/02 521/182 |
| 2015/0368368 | A1* | 12/2015 | Retsina | C09D 101/04 106/203.2 |
| 2016/0168363 | A1* | 6/2016 | Nelson | C08L 1/04 428/35.7 |
| 2016/0297962 | A1* | 10/2016 | Nelson | C08J 3/005 |
| 2018/0258259 | A1* | 9/2018 | Banerjie | C08L 101/00 |
| 2020/0157318 | A1* | 5/2020 | Seo | C08L 1/02 |
| 2020/0216660 | A1* | 7/2020 | Oh | C08J 5/04 |

FOREIGN PATENT DOCUMENTS

| CN | 103987756 A | 8/2014 |
|---|---|---|
| JP | 2011-208015 A | 10/2011 |
| JP | 2016-94541 A | 5/2016 |
| KR | 10-2011-0101376 A | 9/2011 |
| KR | 10-2014-0105528 A | 9/2014 |

OTHER PUBLICATIONS

International Search Report for PCT/KR2018/006977 dated Sep. 18, 2017.
Xuzhen Zhang et al., "Reinforcement effect of poly(butylene succinate) (PBS)-grafted cellulose nanocrystal on toughened PBS/polylactic acid blends", Carbohydrate Polymers, vol. 140, pp. 374-382, 2016.
Elena Fortunati et al., "Processing and characterization of nanocomposite based on poly(butylene/triethylene succinate) copolymers and cellulose nanocrystals", Carbohydrate Polymers, vol. 165, pp. 51-60, 2017.

* cited by examiner

*Primary Examiner* — Liam J Heincer
(74) *Attorney, Agent, or Firm* — The PL Law Group, PLLC (57) ABSTRACT

A polybutylene succinate (PBS) nanocomposite material includes a matrix comprising polybutylene succinate chains, and nanocelluloses dispersed between the polybutylene succinate chains. The PBS composite material may be produced by polymerizing 1,4-butanediol and succinic acid or a derivative thereof in a mixture of 1,4-butanediol and succinic acid or a derivative thereof with nanocelluloses. The PBS nanocomposite material and the method have improved properties, which does not require a surface hydrophobization pretreatment process of cellulose, melt kneading, and solution mixing processes.

9 Claims, 4 Drawing Sheets

PBS COMPOSITE MATERIAL AND METHOD FOR PRODUCING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/006977, filed Jun. 20, 2018, which claims priority to the benefit of Korean Patent Application No. 10-2017-0078058 filed in the Korean Intellectual Property Office on Jun. 20, 2017, the entire contents of which are incorporated herein by reference.

TECHNICAL FIELD

The present invention relates to a PBS composite material and a method for producing the same.

BACKGROUND ART

As fossil raw materials are depleted and needs of consumers for eco-friendly materials are increased, greater utilization of biomass is being actively explored. The biomass includes various types of bio-based polymers, and among them, cellulose is attracting public attention in terms of reproducibility. Cellulose, in which glucose units are polymerized, is an organic compound that is common in nature, and belongs to a polymer having a large molecular weight among polysaccharide materials.

Figure 1:
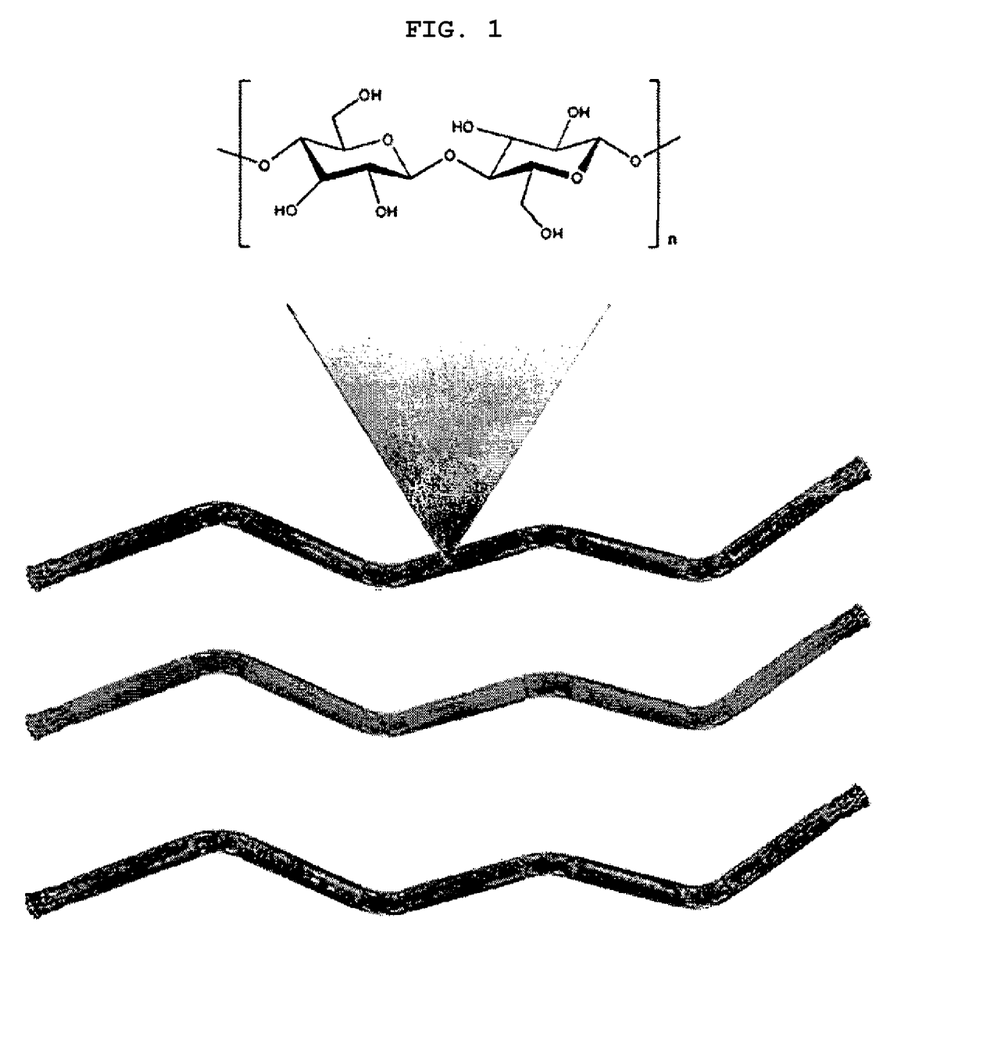
FIG. 1 is view illustrating a cellulose nanofiber which forms cellulose.

The cellulose consists of crystalline nanofibers on natural biomass (FIG. 1). In particular, cellulose nanofibers are known to have a mechanical strength of one strand ranging from tens to hundreds of GPa. While the cellulose nanofiber has a high mechanical strength, it is an eco-friendly bio material. Since nanofibers are strongly crystallized by a hydrogen bond, it is difficult to be extracted in a form of nanofibers.

In order to extract by defibrating from the cellulose to a state of nanofibers, a top-down defibration method in which nanofibers are separated from each other, that is, a method of finely slicing or cutting out a bulk material is required. A method of treating cellulose with an oxidant containing sodium hypochlorite (NaClC) or sulfuric acid in the presence of an N-oxyl compound catalyst represented by (2,2, 6,6-tetramethylpiperidin-1-yl)oxidanyl (TEMPO) in water, then applying a dispersion force, is known in the art.

Such a method only modifies surfaces of the nanofibers and does not cause a breakage in crystal structures of the nanofiber. Meanwhile, hydroxy groups with strong hydrogen bonds disappear, and the nanofibers have negative charges to generate repulsive forces. Accordingly, the nanofibers can be dispersed in an aqueous solution. As another method, when adding sulfuric acid of a certain concentration to cellulose and applying it to the surfaces of nanofibers, chitin, chitosan, and cellulose form sulfonic acid (R-SO3H) groups on the surfaces of the nanofibers, and thereby repulsive forces are generated by the negative charges, such that the nanofibers can be dispersed in an aqueous solution. The fibrous cellulose material prepared as described above refers to a "nanocellulose." Representative examples of the nanocellulose include cellulose nanocrystals (CNC) and cellulose nanofibers (CNF). The CNC has a length of 150-200 nm and a diameter of about 5-20 nm in a product. The CNF has a length of several μm (1-5 μm) and a diameter of about 10-20 nm. In addition, the nanocellulose has an acidity after the above-described chemical treatment. Immediately after production, the nanocellulose is in an acidic state and is treated with alkali hydroxides (e.g., NaOH) for neutralization, thereby containing a small amount of alkali cations such as sodium (Na+) and potassium (K+).

As described above, since one strand of the nanocellulose fiber is a high-strength crystalline material, when fabricating a polymer composite material by mixing the nanocelluloses, it is possible to reinforce insufficient mechanical and thermal properties of the matrix polymer.

When manufacturing a polymer composite material using nanofibrillated celluloses which may be prepared by a relatively mild process without a nanofiberization process including delamination and defibration to fabricate the nanocellulose, it is not possible to expect mechanical reinforcement effects due to a low aspect ratio of a reinforcement material.

Therefore, only by fabricating a polymer composite material using nanocellulose, it is possible to prepare a material having physical properties exceeding those of the existing composite material. A difficulty in fabricating the polymer nanocomposite material using nanocellulose is that the cellulose is generally a hydrophilic component having a hydroxy group (—OH), such that it is not mixed well with generally hydrophobic polymers and plastic materials. Even when mixed therewith, the celluloses are easily aggregated to lose their function as a nanomaterial.

A method of increasing miscibility of the nanocellulose with the polymer composite material is to make the nanocellulose have hydrophobic properties through a composite surface hydrophobization modification process. This process leads to costs and production time delays from an industrial point of view. When performing surface modification, the aspect ratio of the nanocellulose is decreased to cause a reduction in the mechanical reinforcing effect.

There are largely two methods to mix nanocellulose having hydrophobically modified surface with the polymer. A first method is to mix a polymer melt with the nanocellulose in a heated state, and in this case, the miscibility with the nanocellulose is significantly deteriorated due to the high viscosity of the polymer melt phase. In addition, the nanocellulose is thermally decomposed because it is exposed to heat for a long period of time. A second method is to mix the polymer with nanocellulose by performing solubilization using an organic solvent. In this case, the use of the organic solvent may cause environmental pollution.

In the present invention, a PBS nanocomposite including nanocellulose is produced by an in-situ polymerization method without 1) the surface hydrophobization modification process of the nanocellulose, and 2) a heat mixing process or a solvent mixing process.

SUMMARY

An object of the present invention is to provide a PBS nanocomposite material having improved physical properties.

Another object of the present invention is to provide a method for producing a PBS nanocomposite material having improved physical properties, which does not require a surface hydrophobization pretreatment process of cellulose, melt kneading, and solution mixing processes, etc.

1. A PBS composite material including: a matrix including polybutylene succinate chains; and nanocelluloses dispersed between the polybutylene succinate chains.

2. The PBS composite material according to the above 1, wherein the PBS composite material is produced by polymerizing 1,4-butanediol or derivative thereof and succinic acid or derivative thereof in a mixture of 1,4-butanediol or derivative thereof, succinic acid or derivative thereof with nanocelluloses.

3. The PBS composite material according to the above 1, wherein the matrix further includes a polymer chain including a repeating unit represented by Formula 3 below.

[Formula 3]

(wherein $R_1$ is each independently in each repeating unit an alkylene group having 1 to 100 carbon atoms, a cycloalkylene group having 4 to 8 carbon atoms, or an arylene group having 6 to 18 carbon atoms, and the alkylene group may be disconnected by O, a cycloalkylene group having 4 to 8 carbon atoms or an arylene group having 6 to 18 carbon atoms).

4. The PBS composite material according to the above 1, wherein the nanocellulose is included in an amount of 0.01 to 20% by weight based on a total weight of the PBS composite material.

5. The PBS composite material according to the above 1, wherein the nanocellulose includes cellulose nanocrystal, cellulose nanofiber, or a mixture thereof.

6. The PBS composite material according to the above 1, wherein the nanocellulose includes a cellulose having a diameter of 2 nm to 200 nm.

7. The PBS composite material according to the above 1, wherein the nanocellulose includes monovalent cations in an amount of 3000 ppm or less.

8. The PBS composite material according to the above 1, wherein the nanocellulose has a pH of 6 to 8.

9. A method for producing a PBS composite material, including:
polymerizing 1,4-butanediol and succinic acid or derivatives thereof in a mixture of 1,4-butanediol and succinic acid or derivatives thereof with nanocelluloses.

10. The method for producing a PBS composite material according to the above 9, wherein the nanocellulose has a pH of 6 to 8.

11. The method for producing a PBS composite material according to the above 9, wherein an additional diol compound is polymerized together during the polymerization.

12. A product produced by including the PBS composite material according to any one of the above 1 to 8.

The PBS composite material of the present invention may have improved physical properties such as a high glass transition temperature, high tensile strength, low thermal expansion coefficient and the like.

The method for producing a PBS composite material of the present invention does not require the surface hydrophobization pretreatment process of cellulose, melt kneading, and solution mixing processes, etc., and it is possible to manufacture a PBS nanocomposite material having improved physical properties.

DETAILED DESCRIPTION

Hereinafter, the present invention will be described in more detail.

A PBS composite material of the present invention includes a matrix including polybutylene succinate (PBS) chains and nanocellulose dispersed between the polybutylene succinate chains.

Polybutylene succinate is a polymer having a repeating unit represented by Formula 1 below, which may be obtained, for example, by condensation polymerization of 1,4-butanediol or derivative thereof and succinic acid or derivative thereof.

[Formula 1]

A molecular weight of the polybutylene succinate according to the present invention is not particularly limited, and for example, a number average molecular weight thereof may be 500 to 1,000,000.

Cellulose is composed of crystalline nanofibers having a diameter of several tens of nanometers on a biomass, and these nanofibers has a strength of 80 to 120 GPa, and thereby it is possible to expect high mechanical reinforcing effects when using as a composite material.

Cellulose is a polymer having a repeating unit represented by Formula 2 below.

[Formula 2]

In the above Formula 2, n is 10 to 35,000.

The nanocelluloses according to the present invention permeate the polybutylene succinate matrix to be dispersed between the polybutylene succinate chains. As the nanocelluloses are dispersed between the polybutylene succinate chains, it is possible to obtain effects of improving physical properties such as increasing the glass transition temperature, increasing a tensile strength, and decreasing the thermal expansion coefficient by binding the polybutylene succinate molecular chains by the nanocelluloses.

The nanocelluloses may be obtained by defibrating cellulose. The defibration may be performed according to a method known in the art, and may include, for example, sulfuric acid treatment, TEMPO oxidation, mechanical delamination, etc., but it is not limited thereto.

The nanocellulose is nanofibers composed of cellulose, and may include, for example, cellulose nanocrystals, cellulose nanofibers or a mixture thereof, but it is not limited thereto.

In a case of the cellulose nanocrystals, for example, a length thereof may be 50 nm to 500 nm, and specifically 100 nm to 300 nm, and a diameter thereof may be 2 nm to 200 nm, and specifically 5 nm to 20 nm, but it is not limited thereto.

In a case of cellulose nanofibers, for example, a length thereof may be 0.1 μm to 10 μm, and specifically 0.5 μm to 7 μm, and a diameter thereof may be 2 nm to 200 nm, and specifically 5 nm to 20 nm, but it is not limited thereto.

The nanocellulose may include monovalent cations such as sodium, potassium and the like.

The monovalent cations may be included, for example, in an amount of 3000 ppm or less in the nanocelluloses. If the content thereof exceeds 3000 ppm, mechanical properties of the PBS composite material may be lowered. Specifically, the nanocellulose according to the present invention may include the monovalent cations in an amount of 2 ppm to 3000 ppm, but it is not limited thereto.

The nanocellulose may have a pH of, for example, 6-8. When the pH thereof is within the above range, the mechanical properties of the PBS composite material may be excellent.

A content ratio of polybutylene succinate and nanocellulose is not particularly limited, and for example, the nanocellulose may be included in an amount of 0.01 to 20% by weight ('wt. %') based on a total weight of the PBS composite material, and preferably 0.05 to 15 wt. %, and more preferably 0.1 to 10 wt. %. If the content of the nanocellulose is less than 0.01 wt. %, the effect of improving physical properties due to an addition of the nanocellulose may be insignificant, and if the content thereof exceeds 20 wt. %, it may be hard but easily be broken.

An implementation method so that the nanocelluloses are dispersed between the polybutylene succinate chains is not particularly limited, and for example, it is possible to implement the dispersion by adding nanocelluloses together and conducting in-situ polymerization during the production of polybutylene succinate by the polymerization of 1,4-butanediol and succinic acid (or derivatives thereof).

When adding the nanocelluloses together and conducting in-situ polymerization during the production of polybutylene succinate by the polymerization of 1,4-butanediol and succinic acid, the nanocelluloses permeate a PBS matrix at a molecular level, thereby binding the PBS chains, such that the glass transition temperature and the tensile strength may be increased, and the thermal expansion coefficient may be decreased.

An addition time of the nanocellulose of the present invention is preferably before the start of a polycondensation reaction, but the nanocellulose may be added to a reaction system at any stage of before the start of an esterification reaction or a transesterification reaction and during the reaction.

The glass transition temperature of the nanocellulose may be, for example, −25° C. to −20° C., but it is not limited thereto.

The tensile strength of the nanocellulose may be, for example, 40 MPa to 50 MPa, but it is not limited thereto. The thermal expansion coefficient of the nanocellulose may be, for example, a range of 30 μm/m·° C. to 150 μm/m·° C., which is a thermal expansion coefficient (CTE) measured between 30 and 100 degrees Celsius (° C.), but it is not limited thereto.

If necessary, the PBS matrix according to the present invention may further include a polymer chain including a repeating unit represented by Formula 3 below.

[Formula 3]

(wherein $R_1$ is each independently in each repeating unit an alkylene group having 1 to 100 carbon atoms, a cycloalkylene group having 4 to 8 carbon atoms, or an arylene group having 6 to 18 carbon atoms, and the alkylene group may be disconnected by O, a cycloalkylene group having 4 to 8 carbon atoms or an arylene group having 6 to 18 carbon atoms).

The alkylene group in the above Formula 3 may have carbon atoms of, for example, 1 to 100, 1 to 50, 1 to 30, 1 to 10, and more specifically 1 to 10 in a range of 1 to 100, but it is not limited thereto.

The repeating unit represented by Formula 3 may be included in a chain separate from the polybutylene succinate chain, or may be included in the polybutylene succinate chain.

The repeating unit represented by Formula 3 may be obtained by, for example, polymerizing an additional diol compound at the time of polymerization of 1,4-butanediol and succinic acid (or derivatives thereof).

Examples of the additional diol compound may include, for example, aliphatic glycols such as ethyleneglycol, 1,2-propyleneglycol, 1,3-propyleneglycol, diethyleneglycol, triethyleneglycol, 1,2-butyleneglycol, 1,3-butyleneglycol, 2,3-butyleneglycol, 1,4-butyleneglycol, 1,5-pentanediol, neopentylglycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethyleneglycol, 1,12-dodecanediol, polyethyleneglycol, polytrimethyleneglycol, polytetramethyleneglycol, etc.; aromatic glycols such as hydroquinone and glycols having ethylene oxide added to these glycols, but it is not limited thereto.

In addition, the present invention also provides a method for producing a PBS composite material.

The method for producing a PBS composite material of the present invention includes polymerizing 1,4-butanediol and succinic acid or derivatives thereof in a mixture of 1,4-butanediol, succinic acid or derivatives thereof with nanocelluloses.

When polymerizing the 1,4-butanediol and succinic acid or derivatives thereof in the mixture of 1,4-butanediol and succinic acid or derivatives thereof with nanocellulose, since the nanocelluloses are mixed with monomers, polybutylene succinate matrices are formed in a state in which the nanocelluloses are dispersed between the chains during forming the polybutylene succinate chains.

The derivative of succinic acid is not particularly limited so long as it can be polymerized with 1,4-butanediol to form polybutylene succinate, and may be, for example, a form in which both carboxyl groups of the succinic acid are substituted by carboxyhalide, carboxylate, or carboxyester group. Examples of the derivative of succinic acid may include succinyl chloride, dimethyl succinate, diethyl succinate, dibasic ester, and the like, but it is not limited thereto.

Nanocellulose may be the components within the above-described range.

The content of the nanocellulose in the mixture is not particularly limited, and may be included, for example, in an amount of 0.01 to 20 wt. %, and preferably 0.1 to 10 wt. % based on the total weight of the mixed dispersion.

By performing the polymerization while removing water or alcohol from the mixture, it is possible to form a matrix including polybutylene succinate chains and a PBS composite material in which nanocelluloses are dispersed between the polybutylene succinate chains.

Polymerization conditions are not particularly limited and may be performed, for example, in a heating condition of 150° C. to 250° C. Specifically, the polymerization may be performed by adding, to the above mixture, a catalyst which is prepared by coexisting polycondensation catalysts such as Ti(Obu)$_4$, antimony compounds, titanium compounds, germanium compounds, tin compounds, etc., within a range of an addition amount in which these components does no cause problems in characteristics and workability of the composite material and products as described above, then primary heating the resulting mixture while stirring in the above-described temperature range and further heating within the above-described temperature, followed by secondary heating while stirring.

The catalyst may be added, for example, in an amount of 100 ppm to 5000 ppm, and specifically 500 to 2000 ppm, but it is not limited thereto.

Specifically, the primary heating may be performed at 180° C. to 220° C. for 1 hour to 3 hours, but it is not limited thereto.

Specifically, the secondary heating may be performed at 230° C. to 250° C. for 1 hour to 3 hours, but it is not limited thereto.

The stirring may be performed, for example, at 10 to 300 rpm, and specifically at 30 to 80 rpm, but it is not limited thereto.

The method for producing a PBS composite material of the present invention may polymerize the additional diol compound together at the time of the polymerization.

In such a case, the matrix according to the invention may further include a polymer chain including not only polybutyrensuccinate chain but also a repeating unit derived from the diol compound other than 1,4-butanediol.

The repeating unit derived from the diol compound may be represented by, for example, Formula 3 below.

[Formula 3]

(wherein R1 is each independently in each repeating unit an alkylene group having 1 to 100 carbon atoms, a cycloalkylene group having 4 to 8 carbon atoms, or an arylene group having 6 to 18 carbon atoms, and the alkylene group may be disconnected by O, a cycloalkylene group having 4 to 8 carbon atoms or an arylene group having 6 to 18 carbon atoms).

The alkylene group in Formula 3 may have carbon atoms of, for example, 1 to 100, 1 to 50, 1 to 30, 1 to 10, and more specifically 1 to 10 in a range of 1 to 100, but it is not limited thereto.

Examples of the diol compound that can be used herein may include, for example, aliphatic glycols such as ethyleneglycol, 1,2-propyleneglycol, 1,3-propyleneglycol, diethyleneglycol, triethyleneglycol, 1,2-butyleneglycol, 1,3-butyleneglycol, 2,3-butyleneglycol, 1,4-butyleneglycol, 1,5-pentanediol, neopentylglycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethyleneglycol, 1,12-dodecanediol, polyethyleneglycol, polytrimethyleneglycol, polytetramethyleneglycol, etc.; aromatic glycols such as hydroquinone and glycols having ethylene oxide added to these glycols, but it is not limited thereto.

The diol compound may be added during the polymerization of 1,4-butanediol and succinic acid or derivatives thereof, and may be added before the polymerization to be polymerized together.

The method for producing a PBS composite material of the present invention may further include mixing 1,4-butanediol or derivative thereof and succinic acid or derivative thereof with nanocelluloses.

The nanocellulose may be mixed with, for example, 1,4-butanediol or derivative thereof and succinic acid or derivative thereof in a state of powders.

The mixing order is not particularly limited, and the nanocellulose may be mixed with 1,4-butanediol or derivative thereof and then mixed with succinic acid or derivative thereof, or vice versa, the nanocellulose may be mixed with 1,4-butanediol or derivative thereof and then mixed with succinic acid or derivative thereof.

For dispersion of the nanocelluloses during mixing, stirring, homogenization, sonication, and the like may be performed.

Specific examples of the mixing conditions may include stirring the mixture at 10 to 100 rpm under heating conditions at 100 to 200 in a nitrogen atmosphere, but it is not limited thereto.

When mixing the nanocellulose with 1,4-butanediol and succinic acid (and/or derivatives thereof), the nanocelluloses may be dispersed with high stability. For example, when observing the mixture after 6 hours elapses from the mixing, a precipitate of nanocellulose may not occur. Therefore, the inventive method does not require the surface hydrophobization modification process for improving the miscibility with a polymer, and processes such as melt kneading and solubilization in an organic solvent.

In addition, the present invention further provides a product prepared by including the PBS composite material.

The PBS composite material of the present invention may be excellent in mechanical and thermal properties, thereby being variously applied to all products using a polymer resin.

Hereinafter, the present invention will be described in detail with reference to examples.

EXAMPLE

1. Measurement of Length of Nanocellulose Using Atomic Force Microscopy (AFM)

Figure 2:
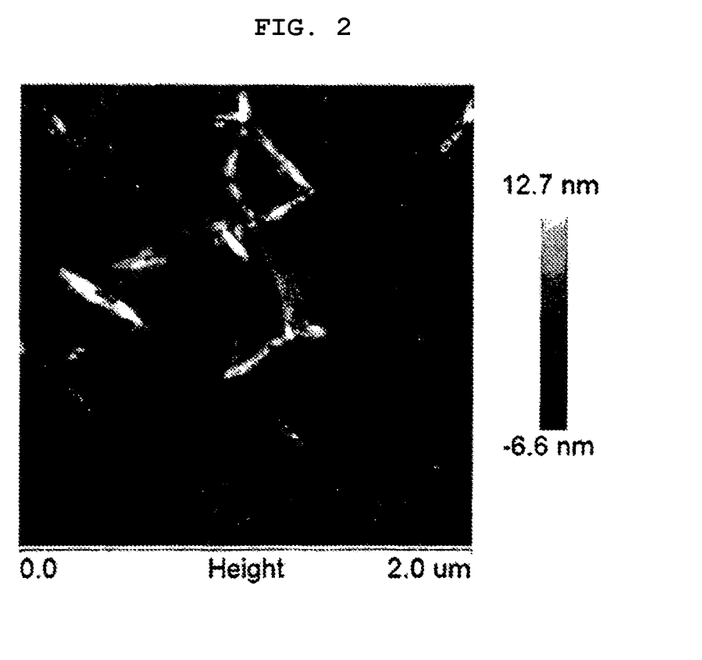
FIG. 2 is an atomic force microscope (AFM) image of cellulose nanocrystal (CNC).
Figure 3:
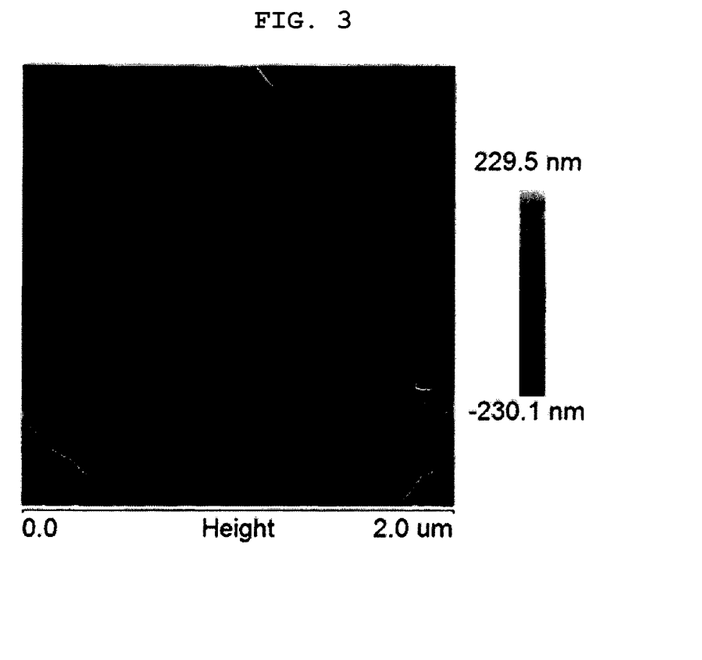
FIG. 3 is an AFM image of cellulose nanofiber (CNF).

Two types of nanocellulose were purchased from the University of Maine which mass-produces and sells the same (http://umaine.edu/pdc/cellulose-nano-crystals/). A product, called cellulose nanocrystal (CNC), has a length of 150-200 nm and a diameter of about 5-20 nm (Composites Part B: Engineering Volume 79, 15 Sep. 2015, Pages 521-529). A product, called cellulose nanofiber (CNF), has a length of several μm (1-5 μm) and a diameter of about 10-20 nm (Progress in Organic Coatings 76.2 (2013): 477-481). The CNC and CNF were provided as a product in a spray dried powder state. The CNF and CNF were dispersed in water so as to be 0.1 wt. %, respectively, and then applied to a silicon wafer, followed by drying the same. In addition, the diameters thereof were measured by Veeco Dimension 3100. As a result, it was confirmed that the CNF and CNF were nanocellulose having a diameter of several nanometers as product information (FIGS. 2 and 3). pH of the CNC and CNF used in this experiment were 6.8 and 7.2, respectively.

Figure 4:
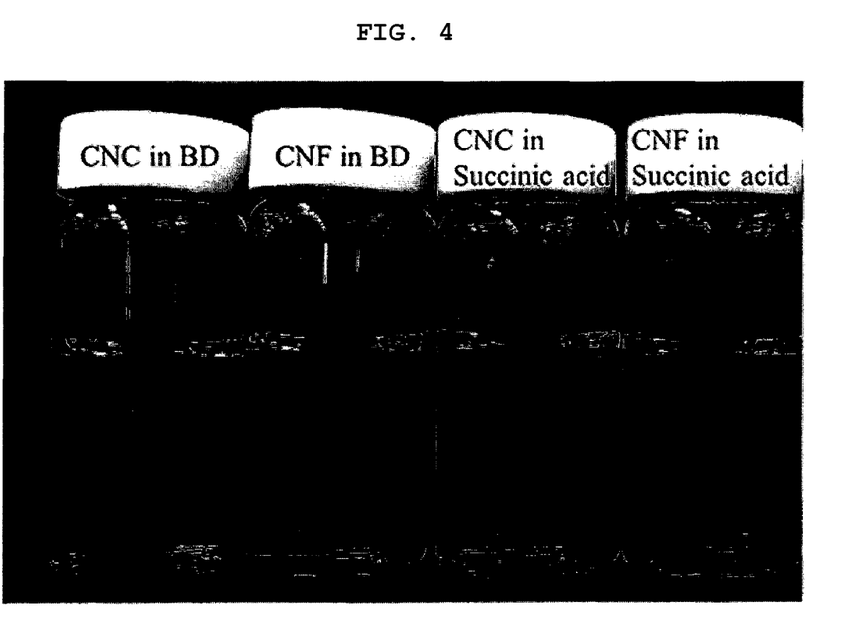
FIG. 4 is a photograph in which cellulose nanocrystals and nanofibers are dispersed in 1,4-butanediol and succinic acid.

2. Confirmation of Dispersibility of Nanocellulose in 1,4-butanediol (BD) or Succinic Acid The CNC and CNF were dispersed in BD and succinic acid so as to be 1 wt. %, and then left for one week. Thereafter, the inventors confirmed whether two nanocelluloses were precipitated (FIG. 4). As seen from FIG. 4, both the CNC and CNF-dispersed BD dispersion and the CNC and CNF-dispersed succinic acid dispersion were transparent, and maintained in the dispersed state after one week without precipitation.

Particle diameters of the CNC and CNF in the CNC and CNF-dispersed BD dispersion and the CNC and CNF-dispersed succinic acid dispersion were measured by a particle size analyzer (Table 1). As seen from Table 1 below, it can be confirmed that the CNC and CNF are dispersed to a level of several tens of nanometers in two solvents. Thereby, it can be seen that the CNC and CNF having hydrophilic properties are dispersed in the CNC and CNF-dispersed BD and succinic acid dispersions which are hydrophilic solvents with high safety.

Particle sizes of CNC and CNF in the CNC and CNF-dispersed BD and succinic acid dispersions

TABLE 1

| Sample | Particle size |
|---|---|
| 1 wt. % of CNC-dispersed BD | 24.2 nm |
| 1 wt. % of CNF-dispersed BD | 37.8 nm |
| 1 wt. % of CNC-dispersed succinic acid | 41.5 nm |
| 1 wt. % of CNF-dispersed succinic acid | 37.1 nm |

3. In-Situ Polymerization of Polymer after Dispersing Nanocellulose in BD (1,4-butantidol) and Succinic Acid CNC and CNF powders were put in BD and then dispersed by a bath sonicator for 10 minutes. The CNC and CNF-dispersed BD dispersion was put in a reactor, and succinic acid having the same molar equivalent as BD was added together thereto. The mixture was heated to 150° C. in a nitrogen atmosphere and stirred at 50 rpm to obtain a BD/succinic acid mixed dispersion containing the CNC and CNF blended therein. Nanocelluloses (CNC and CNF) having contents ranging from 0 wt. % to 15 wt. % based on the total weight of the mixed dispersion were prepared, and the types of samples are summarized in Table 2 below. 1000 ppm of Ti(Obu)4 as a catalyst was added to the mixed dispersion, and heated to 200° C. for 2 hours while stirring at 60 rpm. The temperature was increased to 240° C. and a reaction was performed for 2 hours while stirring at 60 rpm. The number average molecular weight (Mn) of PBS which forms the completed PBS nanocomposite was analyzed by gel permeation chromatography (GPC).

The nanocellulose and pure PBS were polymerized in a level similar to the number average molecular weight (Mn) of PBS which forms the composite (Table 2). This allows a direct comparison therebetween in the evaluation of mechanical and physical properties.

Type of PBS/nanocellulose composite prepared by in-situ polymerization method

TABLE 2

| Content of in-situ polymerized PBS nanocellulose | | Number average molecular weight of PBS |
|---|---|---|
| Type of nanocellulose | Weight ratio of nanocellulose | |
| Pure PBS | 0% | 37,507 |
| CNC | 0.05% | 38,700 |
| CNC | 1% | 36,022 |
| CNC | 15% | 40,123 |
| CNF | 0.05% | 39,189 |
| CNF | 1% | 37,879 |
| CNF | 15% | 36,719 |
| CNF | 35% | 35,962 |

4. Measurement of Glass Transition Temperature of PBS Nanocellulose Composite Polymerized in Example 3

Glass transition temperatures of the PBS nanocomposites containing the pure PBS and nanocellulose, namely the CNC and CNF, prepared in Example 3 were measured by a differential scanning calorimetry (DSC) Discovery DSC 2500, followed by scanning from −60° C. to 100° C. It can be confirmed that the glass transition temperature was increased as the cellulose was added. Therefore, it is considered that the nanocellulose permeates a PBS matrix at a molecular level, and the glass transition temperature is increased in proportion to the content of two types of nanocellulose by binding PBS molecular chains.

Glass transition temperature of PBS/nanocellulose composite prepared by in-situ polymerization method (− means a temperature below zero)

TABLE 3

| Content of in-situ polymerized PBS nanocellulose | | Glass transition temperature (° C.) |
|---|---|---|
| Type of nanocellulose | Weight ratio of nanocellulose | |
| Pure PBS | 0% | −32 |
| CNC | 0.05% | −25 |
| CNC | 1% | −22 |
| CNC | 15% | −21 |
| CNF | 0.05% | −25 |
| CNF | 1% | −23 |
| CNF | 15% | −22 |
| CNF | 35% | −22 |

5. Measurement of Tensile Strength of the PBS Nanocellulose Composite Polymerized in Example 3

Tensile strengths of the PBS nanocomposites containing the pure PBS and nanocellulose, namely the CNC and CNF, prepared in Example 3 were measured by universal testing machine (UTM) INSTRON 5582 UTM, which is tensile strength measuring instrument, according to ASTM D638 method.

It can be confirmed that the tensile strength was increased as the content of the nanocellulose is increased (Table 4).

Tensile strength of PBS/nanocellulose composite prepared by in-situ polymerization method

TABLE 4

| Content of in-situ polymerized PBS nanocellulose | | Tensile strength (MPa) |
|---|---|---|
| Type of nanocellulose | Weight ratio of nanocellulose | |
| Pure PBS | 0% | 31 |
| CNC | 0.05% | 42 |
| CNC | 1% | 45 |
| CNC | 15% | 47 |
| CNF | 0.05% | 40 |
| CNF | 1% | 46 |
| CNF | 15% | 47 |
| CNF | 35% | 24 |

6. Measurement of Thermal Expansion Coefficient (CTE) of the PBS Nanocellulose Composite Polymerized in Example 3

CTE values of the PBS nanocomposites containing the pure PBS and nanocellulose, namely the CNC and CNF, prepared in Example 3 were measured by using a thermal expansion coefficient (CTE) TA Instruments Model 2940 according to the ASTM E831 method. As a result, it was confirmed that the CTE of pure PBS was decreased from 293 μm/m·°C. up to about 40-50 μm/m·°C. as the content of the nanocellulose is increased (Table 5).

Thermal expansion coefficient of PBS/nanocellulose composite prepared by in-situ polymerization method

TABLE 5

| Content of in-situ polymerized PBS nanocellulose | | CTE (μm/m · °C.) |
|---|---|---|
| Type of nanocellulose | Weight ratio of nanocellulose | |
| Pure PBS | 0% | 293 |
| CNC | 0.05% | 154 |
| CNC | 1% | 82 |
| CNC | 15% | 42 |
| CNF | 0.05% | 165 |
| CNF | 1% | 79 |
| CNF | 15% | 54 |
| CNF | 35% | 54 |

7. Sodium Content of the PBS Nanocellulose Composites Polymerized in Example 3

The sodium contents of the PBS composites containing the pure PBS and nanocellulose, namely the CNC and CNF, prepared in Example 3 were measured using inductively coupled plasma-mass spectroscopy (ICP-MS). It was found that the PBS composites fabricated in the present invention have sodium contents of about 2-2000 ppm.

Sodium content of PBS/nanocellulose composite prepared by in-situ polymerization method

TABLE 6

| Content of in-situ polymerized PBS nanocellulose | | Sodium content based on total weigh of the composites (ppm) |
|---|---|---|
| Type of nanocellulose | Weight ratio of nanocellulose | |
| Pure PBS | 0% | 0 |
| CNC | 0.05% | 21 |
| CNC | 1% | 833 |
| CNC | 15% | 1822 |
| CNF | 0.05% | 2 |
| CNF | 1% | 274 |
| CNF | 15% | 1941 |
| CNF | 35% | 3521 |

Comparative Example 1-1. Mixture of Nanocellulose in Heated PBS Melt Phase

The pure PBSs (molecular weight of 37,507 g/mol) synthesized in Example 3 were melt-mixed with two types of nanocellulose using a HAAKE™ MiniJet Pro Piston Injection Molding System. Nanocellulose powders dried at 150° C. in a nitrogen atmosphere were added thereto and mixed for 30 minutes. Melt-mixed PBS nanocellulose composite materials of types shown in Table 7 below were fabricated.

Type of PBS/nanocellulose composite prepared by melt-mixing method

TABLE 7

| PBS nanocellulose composite prepared by melt-mixing method | |
|---|---|
| Type of nanocellulose | Weight ratio of nanocellulose |
| Pure PBS | 0% |
| CNC | 0.05% |
| CNC | 1% |
| CNC | 15% |
| CNF | 0.05% |
| CNF | 1% |
| CNF | 15% |

Comparative Example 1-2. Evaluation of Physical Properties of PBS Composite Material Fabricated by Melt-Mixing Method The glass transition temperatures, thermal expansion coefficients, and tensile strengths of the melt-mixed PBS nanocellulose composite materials synthesized in Comparative Example 1 were measured in the same manner as in the examples. The glass transition temperature of the composite prepared by the in-situ method in Example 4 was increased to about 5-10° C., whereas the glass transition temperature of the PBS nanocellulose composite material mixed in a melt phase was increased only by about 1-2° C. (Table 8).

The measured tensile strength of the composite fabricated by the in-situ method in Example 5 was increased to about 7-8 MPa, whereas the tensile strength of the PBS nanocellulose composite material mixed in the melt phase was increased only by about 1-2 MPa (Table 9).

The measured CTE value of the composite prepared by the in-situ method in Example 6 was decreased to 100-200 μm/m·°C. or more, whereas the CTE value of the PBS nanocellulose composite material mixed in the melt phase was decreased only 30-50 μm/m·°C. (Table 10).

The improvement in the mechanical and physical properties of the composite material fabricated by the melt-mixing method measured in the comparative examples is significantly lower than that of the composite material fabricated by the in-situ polymerization method of the examples. Therefore, it is proven that the dispersibility of the nanocellulose fabricated by the in-situ polymerization method is very excellent.

Glass transition temperature of PBS/nanocellulose composite prepared by melt-mixing method

TABLE 8

| Content of melt-mixed PBS nanocellulose | | Glass transition temperature (° C.) |
|---|---|---|
| Type of nanocellulose | Weight ratio of nanocellulose | |
| Pure PBS | 0% | −32 |
| CNC | 0.05% | −31 |
| CNC | 1% | −30 |
| CNC | 15% | −30 |
| CNF | 0.05% | −31 |
| CNF | 1% | −31 |
| CNF | 15% | −31 |

Tensile strength value of PBS/nanocellulose composite prepared by melt-mixing method

TABLE 9

| Content of melt-mixed PBS nanocellulose | | |
|---|---|---|
| Type of nanocellulose | Weight ratio of nanocellulose | Tensile strength (MPa) |
| Pure PBS | 0% | 31 |
| CNC | 0.05% | 33 |
| CNC | 1% | 34 |
| CNC | 15% | 34 |
| CNF | 0.05% | 32 |
| CNF | 1% | 34 |
| CNF | 15% | 35 |

CTE value of PBS/nanocellulose composite prepared by melt-mixing method

TABLE 10

| PBS nanocellulose composite prepared by melt-mixing method | | |
|---|---|---|
| Type of nanocellulose | Weight ratio of nanocellulose | CTE (μm/m · ° C.) |
| Pure PBS | 0% | 293 |
| CNC | 0.05% | 280 |
| CNC | 1% | 264 |
| CNC | 15% | 266 |
| CNF | 0.05% | 284 |
| CNF | 1% | 279 |
| CNF | 15% | 267 |

Comparative Example 2-1. Fabrication of PBS/Nanocellulose Composite Using Chloroform Solution The pure PBSs (molecular weight of 37,507 g/mol) synthesized in Example 3 were dissolved in chloroform so as to be 5 wt. %. Nanocellulose powders dried at 150° C. were added to a chloroform solution in which the PBSs were dissolved in a nitrogen atmosphere, and mixed for 30 minutes. The mixed solution was precipitated in methanol to prepare solution mixed PBS nanocellulose composite material of types shown in Table 11 below.

Type of PBS/nanocellulose composite prepared by solution-mixing method

TABLE 11

| PBS nanocellulose composite prepared by solution-mixing method | |
|---|---|
| Type of nanocellulose | Weight ratio of nanocellulose |
| Pure PBS | 0% |
| CNC | 0.05% |
| CNC | 1% |
| CNC | 15% |
| CNF | 0.05% |
| CNF | 1% |
| CNF | 15% |

Figure 5:
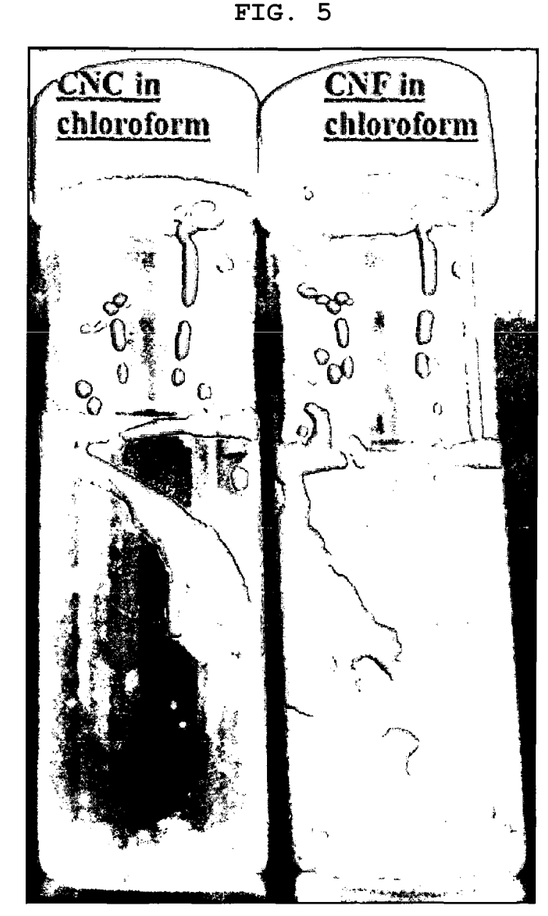
FIG. 5 is a photograph in which the cellulose nanocrystals and nanofibers are dispersed in chloroform.

Comparative Example 2-2. Evaluation of Dispersion and Dispersibility of Nanocellulose in Chloroform CNC and CNF were dispersed in chloroform so as to be 1 wt. % and left for one week. Thereafter, the inventors confirmed whether two nanocelluloses were precipitated (FIG. 5). As seen from FIG. 5, precipitation occurred in the chloroform solution in which the CNC and CNF were dispersed. Accordingly, when mixing the nanocellulose with PBS by the solution-mixing method, dispersibility of nanocellulose would be very deteriorated. Therefore, it is proven that a coagulation phenomenon occurs when mixing the solutions.

Comparative Example 2-3. Evaluation of Physical Properties of PBS Composite Material Prepared by Chloroform Solution-Mixing Method The glass transition temperatures, thermal expansion coefficients, and tensile strengths of the chloroform solution-mixed PBS nanocellulose composite materials synthesized in Comparative Example 2 were measured in the same manner as in the examples.

The glass transition temperature of the composite prepared by the in-situ method in Example 4 was increased to about 5-10° C., whereas the glass transition temperature of the PBS nanocellulose composite material mixed in a solution phase was increased only by 2-3° C. (Table 12).

The measured tensile strength of the composite fabricated by the in-situ method in Example 5 was increased to about 7-8 MPa, whereas the tensile strength of the PBS nanocellulose composite material mixed in the solution phase was not increased or decreased only by 0-1 MPa (Table 13).

The measured CTE value of the composite prepared by the in-situ method in Example 6 was decreased to 100-200 μm/m·° C. or more, whereas the CTE value of the PBS nanocellulose composite material mixed in the solution phase was decreased only about 35-45 μm/m·° C. (Table 14).

The improvement in mechanical and physical properties of the composite material fabricated by the melt-mixing method measured in Comparative Example 2 is significantly lower than that of the composite material fabricated by the in-situ polymerization method of the examples. Therefore, it is proven that the dispersibility of the nanocellulose fabricated by the in-situ polymerization method is very excellent.

Glass transition temperature of PBS/nanocellulose composite prepared by chloroform solution-mixing method

TABLE 12

| Content of solution-mixed PBS nanocellulose | | |
|---|---|---|
| Type of nanocellulose | Weight ratio of nanocellulose | Glass transition temperature (° C.) |
| Pure PBS | 0% | −32 |
| CNC | 0.05% | −32 |
| CNC | 1% | −31 |
| CNC | 15% | −31 |
| CNF | 0.05% | −32 |
| CNF | 1% | −32 |
| CNF | 15% | −29 |

Tensile strength value of PBS/nanocellulose composite prepared by chloroform solution-mixing method

TABLE 13

| Content of solution-mixed PBS nanocellulose | | |
|---|---|---|
| Type of nanocellulose | Weight ratio of nanocellulose | Tensile strength (MPa) |
| Pure PBS | 0% | 31 |
| CNC | 0.05% | 31 |
| CNC | 1% | 32 |
| CNC | 15% | 28 |
| CNF | 0.05% | 31 |
| CNF | 1% | 32 |
| CNF | 15% | 27 |

CTE Value of PBS/nanocellulose composite prepared by chloroform solution-mixing method

TABLE 14

| Content of solution-mixed PBS nanocellulose composite | | |
|---|---|---|
| Type of nanocellulose | Weight ratio of nanocellulose | CTE (μm/m · ° C.) |
| Pure PBS | 0% | 293 |
| CNC | 0.05% | 288 |
| CNC | 1% | 275 |
| CNC | 15% | 263 |
| CNF | 0.05% | 283 |
| CNF | 1% | 278 |
| CNF | 15% | 260 |

Comparative Example 3-1. In-Situ Polymerization of Polymer after Dispersing Microcellulose in BD (1,4-butantidol) and Succinic Acid Microcelluloses having a diameter of micro size were purchased from Sigma Aldrich (Microcrystalline Cellulose or Sigmacell Cellulose). According to Sigma Aldrich, the microcellulose has a diameter of about 20 μm (http://www.sigmaaldrich.com/catalog/product/sigma/s3504?lang=ko&region=KR). The microcelluloses were put in BD and then dispersed by a bath sonicator for 10 minutes. The microcellulose-dispersed BD dispersion was put in a reactor, and succinic acid having the same molar equivalent as BD was added together thereto. The mixture was heated to 150° C. in a nitrogen atmosphere and stirred at 50 rpm to obtain a BD/succinic acid mixed dispersion containing microcelluloses blended therein. Microcelluloses having contents ranging from 0 wt. % to 15 wt. % based on the total weight of the mixed dispersion were prepared, and the types of samples are summarized in Table 15 below. PBS composites were prepared in the same manner as in Example 2, and the molecular weights thereof were measured.

Comparative Example 3-2. Measurement of Glass Transition Temperature of PBS Microcellulose Composite Glass transition temperatures of the PBS microcomposites containing the pure PBS and microcellulose prepared in Comparative Example 3-1 were measured by a differential scanning calorimetry (DSC) Discovery DSC 2500 (Table 15), followed by scanning from −60° C. to 100° C. The glass transition temperature of the nanocellulose composite prepared by the in-situ method in Example 4 was increased to about 5-10° C., whereas the glass transition temperature of the PBS microcellulose composite material mixed in a melt phase was increased only by 1° C. (Table 15).

Glass transition temperature of PBS/microcellulose composite prepared by in-situ polymerization method (− means a temperature below zero)

TABLE 15

| Content of in-situ polymerized PBS microcellulose | | |
|---|---|---|
| Type of microcellulose | Weight ratio of microcellulose | Glass transition temperature (° C.) |
| Pure PBS | 0% | −32 |
| CNC | 0.05% | −32 |
| CNC | 1% | −32 |
| CNC | 15% | −31 |

Comparative Example 3-3. Measurement of Tensile Strength Measurement of PBS Microcellulose Composite Tensile strengths of the PBS microcellulose composites containing the pure PBS and microcellulose prepared in Comparative Example 3-1 were measured by universal testing machine (UTM) INSTRON 5582 UTM, which is tensile strength measuring instrument, according to ASTM D638 method. The tensile strength of the nanocellulose composite fabricated by the in-situ method was increased to about 7-8 MPa, whereas the tensile strength of the microcellulose composite fabricated by the in-situ method was increased only 0-2 MPa (Table 16).

Tensile strength of PBS/microcellulose composite prepared by in-situ polymerization method

TABLE 16

| Content of in-situ polymerized PBS microcellulose | | |
|---|---|---|
| Type of composite | Weight ratio of microcellulose | Tensile strength (MPa) |
| Pure PBS | 0% | 31 |
| Microcellulose | 0.05% | 31 |
| Microcellulose | 1% | 33 |
| Microcellulose | 15% | 33 |

Comparative Example 4. Fabrication of In-Situ PBS Composite Material Using Nanocelluloses Having Different pHs from Each Other To manufacture PBS composites containing the CNCs in Example 3, using CNCs having different pHs (pH index) from each other, PBS/nanocellulose composites containing 1 wt. % of the CNC were fabricated. The pH of the CNC used in Example 3 was 6.8. A CNC having a pH of 2.1 was prepared by treating the CNC with hydrochloric acid in advance, and a CNC having a pH of 11.9 was prepared by treating the CNC with sodium hydroxide (NaOH). The CNCs having different pHs from each other were put in BD and dispersed by a bath sonicator for 10 minutes. The CNC-dispersed BD dispersion was put in a reactor, and succinic acid having the same molar equivalent as BD was added together thereto. The mixture was heated to 150° C. in a nitrogen atmosphere and stirred at 50 rpm to obtain a BD/succinic acid mixed dispersion containing the CNC and CNF blended therein. In the same manner as in the examples, composites were prepared by the polymerization of polymer. The tensile strengths of the PBS composite materials having 1 wt. % of the CNC prepared from CNCs having different pHs from each other in the same manner as in Example 5 were measured. As a result, the composite material of Example 3 using a CNC having a pH of 6.8 showed the highest tensile strength value.

Tensile strength of PBS/CNC composite material prepared using CNCs having different pHs from each other

TABLE 17

| Content of in-situ polymerized PBS nanocellulose | | Tensile strength of PBS/CNC composite (MPa) |
|---|---|---|
| PH of CNC | Weight ratio of nanocellulose | |
| 6.8 | 1% | 45 |
| 2.1 | 1% | 36 |
| 11.9 | 1% | 39 |

The invention claimed is:

1. A polybutylene succinate (PBS) composite material comprising:
a matrix comprising polybutylene succinate chains; and
nanocelluloses dispersed between the polybutylene succinate chains,
wherein the PBS composite material is produced by in-situ polymerizing 1,4-butanediol or a derivative thereof and succinic acid or a derivative thereof in a mixture of 1,4-butanediol or a derivative thereof, succinic acid or a derivative thereof with nanocelluloses;
the nanocellulose is included in an amount of 0.05 to 15% by weight based on a total weight of the PBS composite material;
the nanocellulose includes monovalent cations in an amount of 3,000 ppm or less; and
the glass transition temperature of the PBS composite material is −25° C. to −21° C.

2. The PBS composite material according to claim 1, wherein the matrix further comprises a polymer chain including a repeating unit represented by Formula 3

[Formula 3]

wherein $R_1$ is each independently in each repeating unit an alkylene group having 1 to 100 carbon atoms, a cycloalkylene group having 4 to 8 carbon atoms, or an arylene group having 6 to 18 carbon atoms, and
the alkylene group may be disconnected by O, a cycloalkylene group having 4 to 8 carbon atoms or an arylene group having 6 to 18 carbon atoms.

3. The PBS composite material according to claim 1, wherein the nanocellulose includes cellulose nanocrystal, cellulose nanofiber, or a mixture thereof.

4. The PBS composite material according to claim 1, wherein the nanocellulose includes a cellulose having a diameter of 2 nm to 200 nm.

5. The PBS composite material according to claim 1, wherein the nanocellulose has a pH of 6 to 8.

6. A method for producing a polybutylene succinate (PBS) composite material, comprising:
in-situ polymerizing 1,4-butanediol and succinic acid or a derivative thereof in a mixture of 1,4-butanediol and succinic acid or a derivative thereof with nanocelluloses,
wherein the nanocellulose is included in an amount of 0.05 to 15% by weight based on a total weight of the mixture;
the nanocellulose includes monovalent cations in an amount of 3,000 ppm or less; and
the glass transition temperature of the PBS composite material is −25° C. to −21° C.

7. The method for producing a PBS composite material according to claim 6, wherein the nanocellulose has a pH of 6 to 8.

8. The method for producing a PBS composite material according to claim 6, wherein an additional diol compound is polymerized together during the polymerization.

9. A product produced by the method of claim 6.

* * * * *